United States Patent
Drummond et al.

[11] Patent Number: 5,918,264
[45] Date of Patent: Jun. 29, 1999

[54] FIBER MONITORING SYSTEM

[75] Inventors: Humphrey John Jardine Drummond, South Windsor, Australia; Todd Kenneth Arlon Fischer, New Smyrna Beach, Fla.; Michael Robert Lloyd Selbie, Barley Hill, United Kingdom

[73] Assignee: USF Filtration and Separations Group Inc., Timonium, Md.

[21] Appl. No.: 08/338,582
[22] PCT Filed: Oct. 27, 1993
[86] PCT No.: PCT/AU93/00556
§ 371 Date: Aug. 22, 1995
§ 102(e) Date: Aug. 22, 1995
[87] PCT Pub. No.: WO94/09890
PCT Pub. Date: May 11, 1994

[30] Foreign Application Priority Data

Nov. 2, 1992 [AU] Australia ............................... PL 5629

[51] Int. Cl.$^6$ .............................. B01D 65/10; G01M 3/06
[52] U.S. Cl. ............................................... 73/37; 73/40
[58] Field of Search .................................. 73/37, 38, 40

[56] References Cited

U.S. PATENT DOCUMENTS

| | | | |
|---|---|---|---|
| H1045 | 5/1992 | Wilson | 73/40 |
| 3,693,406 | 9/1972 | Tobin, III | 73/40 X |
| 3,968,192 | 7/1976 | Hoffman, III et al. | 264/36 |
| 4,188,817 | 2/1980 | Steigelmann | 73/40.7 |
| 4,248,648 | 2/1981 | Kopp | 156/94 |
| 4,384,474 | 5/1983 | Kowalski | 73/38 |
| 4,511,471 | 4/1985 | Müller | 210/323.2 |
| 4,744,240 | 5/1988 | Reichelt | 73/38 |
| 4,779,448 | 10/1988 | Gogins | 73/38 |
| 5,005,430 | 4/1991 | Kibler et al. | 73/863.33 X |
| 5,417,101 | 5/1995 | Weich | 73/40 X |

FOREIGN PATENT DOCUMENTS

| | | |
|---|---|---|
| 0 518 250 A1 | 12/1992 | European Pat. Off. . |
| 2-674-448-A1 | 10/1992 | France . |
| 61-097006 | 5/1986 | Japan . |
| 62-140607 | 6/1987 | Japan . |
| 307409 | 12/1989 | Japan ............ 73/40 |
| 284035 | 11/1990 | Japan ............ 73/40 |
| 18373 | 1/1991 | Japan . |
| 157654 | 6/1993 | Japan ............ 73/40 |
| 1518688 | 10/1989 | U.S.S.R. ............ 73/37 |

OTHER PUBLICATIONS

Derwent Abstract JP 63–249569.
Derwent Abstract Accession No. 91–276 439/38, Class 503, JP A 31–10445 (Fuji Photo Film) May 10, 1991.

Primary Examiner—Hezron Williams
Assistant Examiner—Daniel S. Larkin
Attorney, Agent, or Firm—Knobbe, Martens Olson & Bear, LLP

[57] ABSTRACT

A failed hollow fiber is located in a membrane filtration module by supplying a gas under pressure to the space between fibers and shell, wetting the ends of fibers, and monitoring the ends of the fibers for bubble formation.

6 Claims, 3 Drawing Sheets

FIBER MONITORING SYSTEM

FIELD OF THE INVENTION

The present invention relates to a method of locating a failed fibre in a fibre membrane filtration system.

The invention has been developed for use in relation to wastewater treatment and will be described hereinafter with reference to that use. However, it will be appreciated that the invention is not limited to that particular field.

BACKGROUND OF THE INVENTION

Fibre membrane filtration is a well developed method which involves the use of a large number of hollow tubular micro-porous fibres, each fibre being adapted to allow filtrate to flow from the exterior of the fibre via micro-pores in the fibre wall to the interior of the fibre while excluding impurities from the filtrate. The pores can be, for example, around 0.2 micrometres in diameter.

In practice, many thousands of fibres are bundled together and encased in a shell with the assembly being known as a module. The shell is usually cylindrical and the fibres extend longitudinally of the shell with the ends of the shell being sealed, usually with a resin or the like known as the potting forming a plug at each end. The ends of the hollow fibres extend through, and are encased in the potting plug so that the interior of the fibres is in communication with the exterior of the module at both ends thereby allowing filtrate to be removed from two end locations. Alternatively, both ends of each fibre may extend through the potting and communicate with the exterior at one end of the module, or the fibres at one end may extend through the potting, the other fibre ends being sealed.

In practice modules are usually (but not necessarily) disposed in "banks", each comprising a row of modules sharing a manifold, the banks being arranged in an array.

In use, feed or influent is introduced to the space intermediate the exterior of the fibres and the interior of a module shell. Filtrate flows through the micro-porous membrane of the fibres into the interior of the fibres and thereafter flows along the length of the fibres passing through the plug to the exterior of the module, usually into a manifold.

A wastewater filtering system may comprise several hundred modules, each module containing many thousands of fibres. Although failure in these systems is rare, the failure or breakage of a single fibre may compromise the integrity of the entire system by allowing unfiltered influent to enter the interior of the failed fibre and thereby contaminate the filtrate.

A fibre may fail for example due to the presence of a sharp or hard particle in the influent, or for other reasons. On such occasions a difficulty arises in identifying the failed fibre within the many thousands of fibres in the system.

A known test for identifying a module containing a failed fibre is the Diffusive Air Flow Test (DAF). In this test the space intermediate the fibres and shell of a selected module or modules is filled with air and the interior of the fibres is supplied with pressurized air. The fibre membrane is wetted to fill the pores with liquid and the rate at which air diffuses from the interior of the fibre to the exterior of the fibre is measured. In the absence of any failed fibres the rate will correlate with a reference value which is indicative of the expected diffusive flow from the fibre interior to the fibre exterior at a given pressure difference for the particular membrane.

It is important to note that if a certain pressure is exceeded diffusive flow will be upset by the creation of bubbles of air at the pores. This is known as the bubble point of the membrane and is defined by the following equation:

$$P = \frac{4 \cdot \cos(\theta) \cdot B \cdot \gamma}{d}$$

where P=Bubble Point Pressure
θ=wetting angle
β=Bechold capillary constant
γ=surface tension of wetting liquid
d=diameter of pore Clearly if a failed fibre is present the measured rate will be higher as it will include a component due to flow of air through the fault as opposed to diffusive flow through the pores.

Whilst this method is useful in identifying a module containing a failed fibre it has some disadvantages and does not extend to identifying the individual failed fibre.

It is an object of the invention to at least ameliorate some of the disadvantages of the prior art.

DISCLOSURE OF THE INVENTION

According to a first aspect the invention consists in a method of locating a failed fibre in a fibre membrane filtration module comprising a shell surrounding a large number of hollow micro-porous fibres adapted to allow filtrate to flow through the fibre membrane during filtration thereby excluding impurities from the filtrate, the interior of each fibre communicating with a manifold and the space intermediate the fibres and shell being isolated from the manifold, said method comprising the steps of:

supplying gas under pressure to the space intermediate the fibres and the shell and wetting the ends of the fibres;

monitoring the ends of the fibres for the formation of bubbles indicative of a failed fibre; and sealing the failed fibre.

According to a second aspect the invention consists in a method of identifying a subset of modules including a module having a failure from among a set of modules, each module comprising a shell surrounding a large number of hollow micro-porous fibres adapted to allow filtrate to flow through the fibre membrane during filtration thereby excluding impurities from the filtrate, the interior of each fibre communicating with a manifold and the space intermediate the fibres and shell being isolated from the manifold, said method comprising the steps of:

filling the space intermediate the fibres and the shell or shells of the subset with liquid;

supplying gas at a pressure below the nominal bubble point of the membrane to the interior of the fibres of the subset;

measuring the rate of displacement of liquid from the space intermediate the fibres and the shell or shells of the subset caused by transfer of the gas from the interior to the exterior of the fibres;

comparing the measured rate of displacement of liquid to a reference rate of displacement; and utilizing the comparison to assess whether a failed fibre is present in the subset.

The subset may for example, be a bank of modules selected from a set consisting of an array or may, for example, be a subset consisting of a single module having a failure to be identified in a set consisting of a bank of modules. The failure may for example be a failed fibre or may be a leak in the potting or a leaking "O" ring or the like.

It will be understood that the steps of the second aspect of the invention can be reversed in the sense that the interior of the fibres may be filled with liquid, a gas may be supplied to the space intermediate the fibres and the shell or shells of the subset, and the rate of displacement of liquid from the interior of the fibres can then be measured and compared to a reference rate.

According to a third aspect the invention consists in a method of identifying a subset of modules including a module having a failure from among a set of modules, said method comprising the steps of:

filling the space intermediate the fibres and the shell or shells of the set with liquid;

supplying gas at a pressure below the nominal bubble point of the membrane to the interior of the fibres of the set; and using transducer means to assess whether bubbles are being formed in a subset of the set.

The set may for example be an array of modules, the subset a bank of modules, and the transducer may be used to produce a signal indicative of bubble formation in the bank signifying that the bank includes a failed fibre. Alternatively, the set may be a bank of modules in which case the subset is a single module and the transducer signal is indicative of the presence or absence of a failure such as a failed fibre in the module.

The transducer means may for example be an accelerometer, microphone or other transducer in conjunction with a suitable signal detection circuit, for example, a sonic tester.

The transducer may be in contact with the shell of a module and used to sense the formation of bubbles in the liquid intermediate the failed fibre and the shell wall.

The transducer means may additionally be used to approximately locate the position of the failed fibre within the module.

BRIEF DESCRIPTION OF DRAWINGS

A preferred embodiment of the invention will now be described, by way of example only, with reference to the accompanying drawings in which.

PREFERRED EMBODIMENTS OF THE INVENTION

Figure 1:
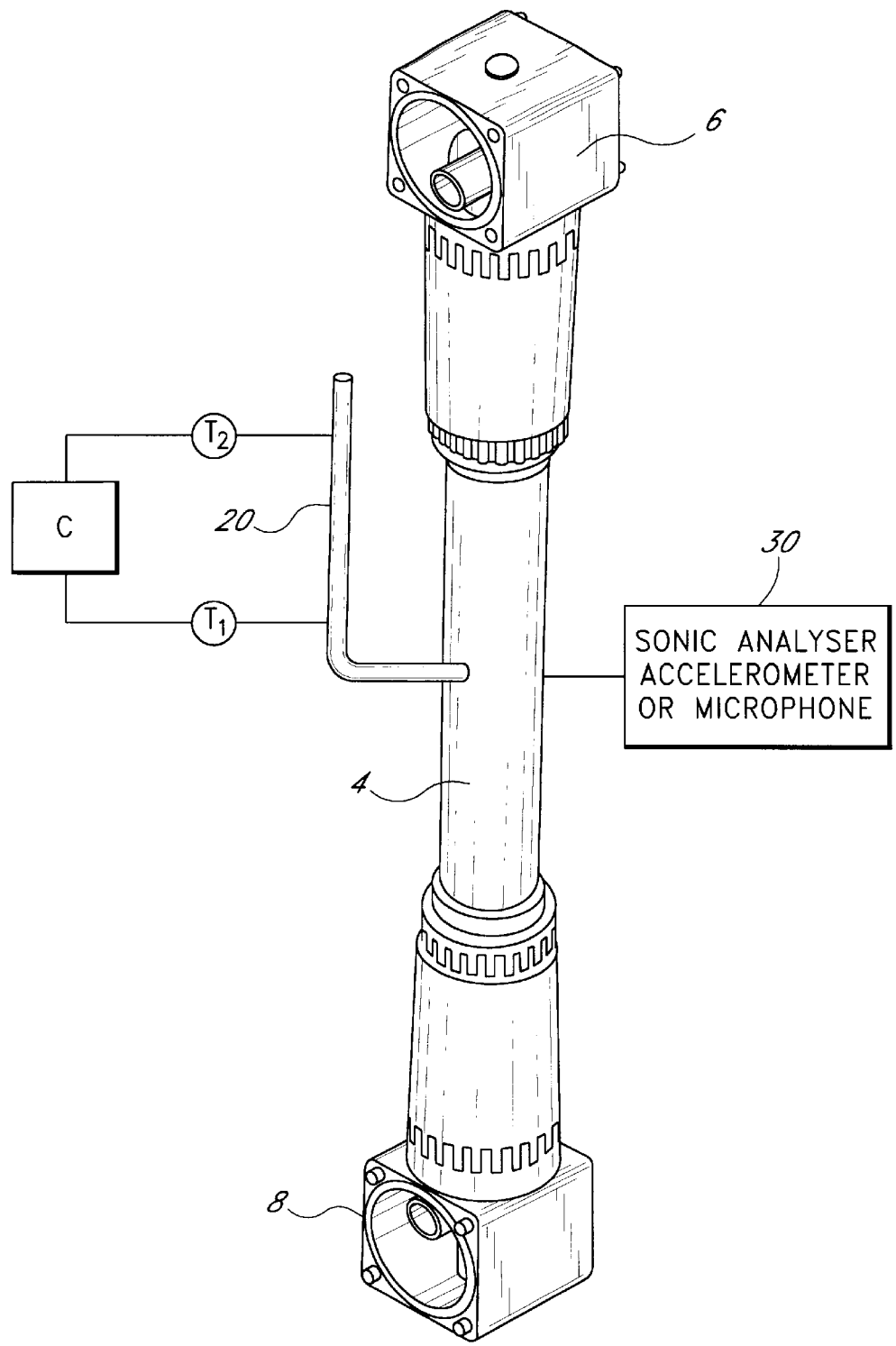
FIG. 1 is a perspective view of a filtration module of the type tested by the invention.

Referring to the drawings, there is shown a module 2 comprising a shell 4 having a manifold 6, 8 at either end.

Figures 2, 3:
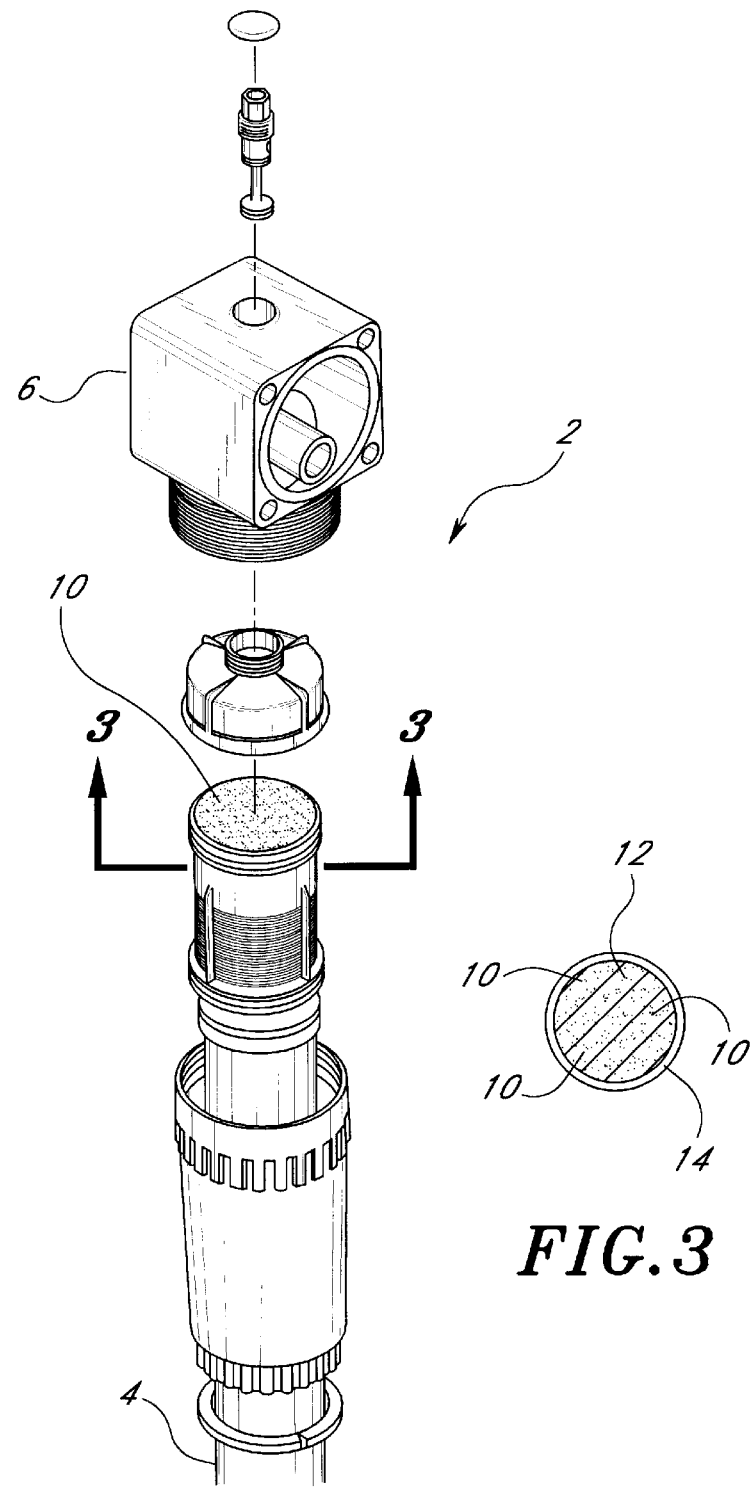
FIG. 2 is an exploded view of a module according to FIG. 1.
FIG. 3 is a schematic sectional view taken along line 3—3 of FIG. 2.

Referring to FIG. 2, there is shown an exploded view of one end of module 2. Shell 4 encloses a large number of longitudinally extending tubular micro-porous fibres 10.

Referring to FIG. 3, there is shown schematically a cross section through FIG. 2 with a small number of fibres. The ends of hollow fibres 10 extend through and are encased in a potting plug 12 made of resin or the like. Potting plug 12 is encased in sleeve 14 and prevents liquid communication between manifold 6 and the space intermediate fibres 10 and the interior of shell 4. However, fibres 10 extend through potting plug 12 thereby facilitating communication between the interior of fibres 10 and manifold 6.

In practice, regular DAF tests are usually incorporated as part of a maintenance program.

Alternatively, a pressure decay test may be regularly employed. In this test, the length of time taken for air under pressure to dissipate through the membrane is used as an indication of the presence or absence of failed fibres. Should these system tests fail to detect the presence of a failed fibre, a fault would be detected by monitoring filtrate quality.

If the presence of a failed fibre in the system is detected or suspected the module containing the failed fibre may be identified in accordance with the second and/or third aspect of the invention. The identified module may then be isolated for example by means of valves, and may subsequently be replaced, or may be repaired in accordance with the first aspect of the invention.

In accordance with the second aspect of the invention, selected modules have the space intermediate fibres 10 and shell 4 filled with water and air is supplied to the interior of the fibres at a sub-nominal bubble point pressure. The diffusion of the air from the interior to the exterior of the fibre causes a displacement of the water and the rate of displacement can be measured. In a preferred embodiment, the rate of displacement is measured by providing a tube 20 extending vertically from and in communication with the space intermediate the fibres and shell. As water is displaced, the level of water in the vertical tube will rise. By measuring the time taken via computer C for the water level to rise between two predetermined points, for example by means of spaced apart level detecting transducers T1, T2 on the tube, the rate of displacement can easily be measured.

For example, air pressure of 80–100 kPa was applied to the inside of the fibres of 60 modules (120 square metres of membrane surface area). Typically the rate of displacement in an integral system of this size is approximately 1 mL/s. If a single broken fibre is present (out of approximately 160,000 fibres), the flow rate can increase to 2.5 mL/s. This gives an early warning of an integrity problem.

Figure 4B:
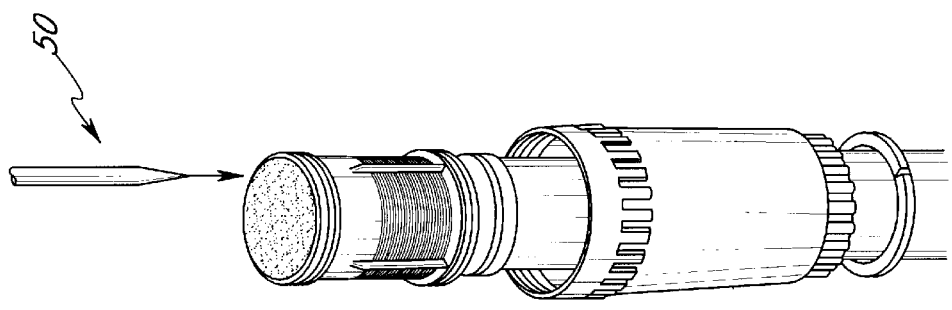
FIGS. 4A and 4B are perspective views of a portion of the module of FIG. 1 displaying alternative techniques for sealing a failed fibre.
Figure 4A:
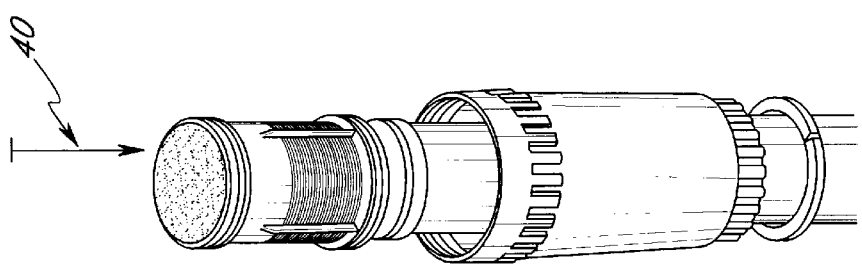

If the rate of displacement exceeds a reference value, then the module containing the failed fibre is identified and, in accordance with the first aspect of the invention, the water in the space intermediate the fibres and shell is replaced with pressurized air and the ends of the fibres are wetted. By monitoring the ends of the fibres for bubbles, a failed fibre can be identified and subsequently sealed. The fibre can be sealed preferably by driving a pin 40 axially into the end of the failed fibre as shown in FIG. 4A or alternatively by melting the fibre, glueing, pinching, chemically treating the fibre or other sealing means 50 as shown in FIG. 4B.

The identification of the individual module containing the failed fibre from a plurality of modules in accordance with the second aspect of the invention differs from the conventional DAF test in that the space intermediate the fibres and the interior of the shell is filled with liquid as compared to the DAF test which uses air. This has a number of advantages:

reduced diffusive air background flows by super saturation of the liquid, reduced sensitivity to membrane dimensions by elimination of the measurement of diffusive flow, more repeatable and reliable flows through leaks by eliminating the tendency for the membrane to dry out, simple and accurate measurement of flows on site by converting difficult to measure low air flows to more easily measured liquid flows, ability to reduce sensitivity to valve leaks by employing a vent above the array and using air flow measurements across the membrane and water flow measurements across the valves (the viscosity of water is about 55 times greater than air and accordingly, valve leaks are correspondingly lower).

It will be understood that the method for locating the failed fibre may be applied equally to a single module in a bank, or to a bank of modules in an array or to an arbitrarily selected subset of a set of modules. Although it is preferred to employ liquid on the shell side of the fibres and pressurize the fibre interior, the method may be conducted by pressurizing the shell side and employing liquid in communication with the fibre interiors.

In accordance with the third aspect of the invention, selected modules have the space intermediate fibres 10 and shell 4 filled with water and air is supplied to the interior of the fibres at a sub-nominal bubble point pressure. If a failed fibre is present, bubbles will usually be formed and sound waves associated with bubble formation can be detected from outside the shell by a sonic analyser, an accelerometer, or a microphone 30. Sonic analysis can be conveniently performed by comparing the sonic spectrum produced with a predetermined sonic spectrum that has a spectral boundary enclosing a region deemed to embrace micro-porous membranes having an acceptable condition of integrity.

If the produced energy within the predetermined spectral boundary is greater then the reference value then the water in the space intermediate the fibres and shell is replaced with pressurized air and the ends of the fibres are wetted. By monitoring the ends of the fibres for bubbles, a failed fibre can be identified and subsequently sealed as previously described.

As previously indicated, this method may also be conducted by pressurizing the shell side of the fibres, while maintaining liquid on the fibre interior side in which case the transducer is employed to detect bubbles e.g. in the manifold. In a further embodiment of the invention (not illustrated) a sonar beam is directed from a transducer so as to extend longitudinally of a manifold. Detection means are adapted to measure the intensity of the beam at the opposite end. The detection means are adapted to issue a signal in response to disturbance of the beam by bubbles. In the case of a detector adapted to detect reflected signals, signals reflected from the bubbles would indicate the distance of the bubbles from the detector and hence identify from which module of the manifold bubbles were emanating. Similarly, a manifold from which bubbles are emanating would be detected in an array.

The second and third aspects of the invention can of course be used in combination.

It will be understood that methods for detecting bubbles need not be sonic and may for example use conductivity, capacitance, density, light transmission, light reflection or other physical changes to sense bubbles. Suitable optical, electrical, or other transducers and circuits for bubble detection are known. If the manifold is transparent, visual detection of bubbles may be employed.

Although the invention has been described primarily in terms of detection of modules with one or more failed fibres, a module failure may arise from a leak in the potting from "O" ring failure, or from other leaks and the method is applicable to identification of such failed modules or module subsets.

As will be apparent to those skilled in the art from the present teaching, the invention may be embodied in other forms and applied in other uses.

What is claimed is:

1. A method of identifying a module having a failed fibre from among a set of at least 60 modules, each module comprising a cylindrical shell surrounding at least 1000 hollow micro-porous fibres wherein each module comprises about 2 square meters of membrane surface area, the fibres comprising pores having an average diameter of about 0.2 micron, the fibers being adapted to allow filtrate to flow through the fibre membrane during filtration thereby excluding impurities from the filtrate, the interior of each fibre communicating with a manifold and the space intermediate the fibres and shell being isolated from the manifold, each module comprising a tube extending vertically from and in communication with the space intermediate the fibres and the shell, said method comprising the steps of:

filling the space intermediate the fibres and the shell with liquid;

supplying gas at a pressure of 80–100 kPa to the inside of the fibres;

measuring the rate of displacement of liquid from the space intermediate the fibres and the shell caused by transfer of the gas from the interior to the exterior of the fibres by measuring the time taken for the liquid level to rise between two predetermined points by means of spaced apart level detecting transducers on the tube; and identifying a module having a failed fibre based on a measured rate of liquid displacement above about 1 mL/s.

2. A method comprising the steps of identifying a module having a failed fibre by a method according to claim 1 in combination with a method of locating the failed fibre comprising the steps of:

wetting the ends of the fibres;

supplying gas under pressure to the space intermediate the fibres and the shell; and monitoring the ends of the fibres for the formation of bubbles indicative of a failed fibre.

3. A method according to claim 2, wherein the failed fibre is sealed by melting the fibre, gluing, pinching, plugging or chemically treating the fibre.

4. A method of identifying a module having a failed fibre from among a set of at least 60 modules, each module comprising a cylindrical shell surrounding at least 1000 hollow micro-porous fibres wherein each module comprises about 2 square meters of membrane surface area, the fibres comprising pores having an average diameter of about 0.2 micron, the fibers being adapted to allow filtrate to flow through the fibre membrane during filtration thereby excluding impurities from the filtrate, the interior of each fibre communicating with a manifold and the space intermediate the fibres and shell being isolated from the manifold, each module comprising a tube extending vertically from and in communication with the manifold, said method comprising the steps of:

filling the inside of the fibres with liquid;

supplying gas at a pressure of 80–100 kPa to the space intermediate the fibres and the shell;

measuring the rate of displacement of liquid from inside the fibres caused by transfer of the gas from the exterior to the interior of the fibres by measuring the time taken for the liquid level to rise between two predetermined points by means of spaced apart level detecting transducers on the tube; and identifying a module having a failed fibre based on a measured rate of liquid displacement above about 1 mL/s.

5. A method comprising the steps of identifying a module having a failed fibre by a method according to claim 4 in combination with a method of locating the failed fibre comprising the steps of:

wetting the ends of the fibres;

supplying gas under pressure to the space intermediate the fibres and the shell; and monitoring the ends of the fibres for the formation of bubbles indicative of a failed fibre.

6. A method according to claim 5, wherein the failed fibre is sealed by melting the fibre, gluing, pinching, plugging or chemically treating the fibre.

* * * * *